United States Patent
Humphris et al.

(10) Patent No.: US 8,910,311 B2
(45) Date of Patent: Dec. 9, 2014

(54) PROBE ASSEMBLY FOR A SCANNING PROBE MICROSCOPE

(75) Inventors: Andrew Humphris, Oxfordshire (GB); David Catto, Norfolk (GB)

(73) Assignee: Infinitesima Ltd., Oxfordshire (GB)

(*) Notice: Subject to any disclaimer, the term of this patent is extended or adjusted under 35 U.S.C. 154(b) by 543 days.

(21) Appl. No.: 12/447,876

(22) PCT Filed: Oct. 31, 2007

(86) PCT No.: PCT/GB2007/004160
§ 371 (c)(1),
(2), (4) Date: Mar. 15, 2010

(87) PCT Pub. No.: WO2008/053217
PCT Pub. Date: May 8, 2008

(65) Prior Publication Data
US 2010/0186132 A1    Jul. 22, 2010

(30) Foreign Application Priority Data

Oct. 31, 2006  (GB) .................................. 0621560.2

(51) Int. Cl.
*G01Q 10/00*        (2010.01)
*G01Q 70/06*        (2010.01)
*B82Y 35/00*        (2011.01)

(52) U.S. Cl.
CPC  *G01Q 70/06* (2013.01); *B82Y 35/00* (2013.01)
USPC .......................................................... 850/1

(58) Field of Classification Search
USPC ............. 850/1, 2, 3, 5, 19, 20, 22, 32, 33, 40, 850/55; 73/105; 977/863
See application file for complete search history.

(56) References Cited

U.S. PATENT DOCUMENTS 5,705,814 A * 1/1998 Young et al. ...................... 850/2
5,908,981 A * 6/1999 Atalar et al. ..................... 73/105
(Continued)

FOREIGN PATENT DOCUMENTS

EP       0854350     7/1998
JP     2000-266657   9/2000
(Continued)

OTHER PUBLICATIONS

Xuefeng Wang et al., "Multifunctional Probe Array for Nano Patterning and Imaging," Nano Letters, ACS, Washington, D.C., vol. 5, No. 10, Sep. 24, 2005, pp. 1867-1972 (XP002410120).

(Continued)

*Primary Examiner* — Michael Logie
*Assistant Examiner* — Jason McCormack
(74) *Attorney, Agent, or Firm* — Volpe and Kornig, P.C.

(57) ABSTRACT

A probe assembly is for use in a scanning probe microscope. The probe assembly includes a carrier having a plurality of at least three substantially identical probes, each probe having a tip that is located on a plane that is common to the plurality of probe tips and that is movable from this plane. The assembly also includes addressing means adapted to select one of the plurality of probes for relative movement with respect to a majority of the remainder of the probes. Such an assembly, with its potential to facilitate rapid, perhaps automated, replacement of a used probe, lends itself to use in high-speed scanning apparatus.

11 Claims, 4 Drawing Sheets

(56) References Cited

U.S. PATENT DOCUMENTS

| | | | |
|---|---|---|---|
| 5,986,262 | A | 11/1999 | Volcker |
| 6,196,061 | B1 * | 3/2001 | Adderton et al. ............... 73/105 |
| 6,279,389 | B1 * | 8/2001 | Adderton et al. ............... 73/105 |
| 6,330,824 | B1 * | 12/2001 | Erie et al. ........................ 73/105 |
| 6,504,152 | B2 * | 1/2003 | Hantschel et al. ............. 850/56 |
| 6,708,556 | B1 * | 3/2004 | Kim et al. ........................ 73/105 |
| 6,776,030 | B1 | 8/2004 | Kirpichnikov et al. |
| 6,867,443 | B2 * | 3/2005 | Liu et al. ....................... 257/226 |
| 7,022,976 | B1 * | 4/2006 | Santana et al. ............... 250/234 |
| 7,253,407 | B1 * | 8/2007 | Kley ............................. 250/306 |
| 7,411,189 | B2 * | 8/2008 | Kawakatsu .................. 250/306 |
| 7,437,915 | B2 | 10/2008 | Binnig et al. |
| 7,483,362 | B2 | 1/2009 | Ishii et al. |
| 7,571,638 | B1 * | 8/2009 | Kley ............................... 73/105 |
| 7,694,347 | B2 | 4/2010 | Kawakatsu |
| 7,958,565 | B2 * | 6/2011 | Ando et al. ...................... 850/33 |
| 2002/0020805 | A1 * | 2/2002 | Shimizu et al. ............... 250/216 |
| 2002/0080710 | A1 * | 6/2002 | Kim et al. ...................... 369/126 |
| 2003/0183761 | A1 * | 10/2003 | Hantschel et al. ............ 250/306 |
| 2004/0020279 | A1 * | 2/2004 | Degertekin et al. ............. 73/105 |
| 2004/0051542 | A1 * | 3/2004 | Miles et al. .................... 324/754 |
| 2004/0119490 | A1 * | 6/2004 | Liu et al. ........................ 324/765 |
| 2004/0255651 | A1 * | 12/2004 | Adderton et al. ............... 73/105 |
| 2005/0239047 | A1 * | 10/2005 | Gimzewski et al. ............. 435/4 |
| 2008/0011065 | A1 * | 1/2008 | Su et al. ........................... 73/105 |
| 2009/0313729 | A1 * | 12/2009 | Ando et al. ...................... 850/33 |

FOREIGN PATENT DOCUMENTS

| | | |
|---|---|---|
| JP | 2004-306197 | 11/2004 |
| JP | 2005331509 | 2/2005 |
| JP | 2005-300177 | 10/2005 |
| RU | 2145055 C1 | 1/2000 |
| WO | 9708733 | 3/1997 |
| WO | 0046568 | 8/2000 |
| WO | WO 2006129561 A1 * | 12/2006 |

OTHER PUBLICATIONS

Lange, D. et al., "CMOS 10-Cantilever array for Constant-Force Parallel Scanning AFM," Transducers '01 Eurosensors XV, The 11th International Conference on Solid-State Sensors and Actuactors, Digest of Technical Papers, Munich, Jun. 10-14, 2001, vol. 2, Jun. 10, 2001, pp. 1074-1077 (XP008006847).

McNamara, Shamus, et al., "Ultracompliant thermal probe array for scanning non-planar surfaces without force feedback," Journal of Micromechanics & Microengineering, Institute of Physics Publishing, Bristol, GB, vol. 15, No. 1, Jan. 1, 2005, pp. 237-243 (XP020091362).

English translation of an Office Action for Japanese Patent Application No. 2009-533955, issued Jun. 14, 2012.

* cited by examiner

PROBE ASSEMBLY FOR A SCANNING PROBE MICROSCOPE

This invention relates to the field of scanning probe microscopes, and specifically to the probes employed in such microscopes. The present invention is particularly, but not exclusively, suited for use with atomic force microscopes.

The field of scanning probe microscopy began in early 1980's with the development of the scanning tunnelling microscope. Since that date a wide range of probe microscopes have been developed, although they are all based on the same fundamental operational principle: an individual nanometric probe is mechanically scanned over a sample surface in order to acquire an "interaction map" of the sample space. Each different type of scanning probe microscope (SPM) is characterised by the nature of the local probe and its interaction with the sample surface.

Some probe techniques, such as scanning near field optical microscopy (SNOM), detect photons generated as a result of probe interaction with an illuminated sample or monitor other related properties such as adsorption, polarisation, wavelength etc. Other probe techniques are based on the detection of variations in a probe—sample interaction force. Techniques in this latter group are known generically as scanning force microscopy (SFM). The interaction force may be, for example, interatomic (atomic force microscopy or 'AFM'), magnetic (magnetic force microscopy or 'MFM'), electric (electrical force microscopy or 'EFM'), amongst others.

Atomic force microscopy (AFM) is the most commonly used scanning probe microscopy technique. In the case of a typical AFM operated in contact mode, the probe is a sharp tip on the end of a cantilever which, when brought into close proximity to the sample, bends in response to the interatomic interaction force between the tip and the sample. An optical lever technique is usually used to measure the bending (deflection) of the cantilever relative to the cantilever mount or to the null position where no force is acting on the tip. The AFM may be operated in one of two regimes: constant force or constant height. Typically the AFM is operated under a constant force regime where a feedback loop is used to maintain a constant interaction force by moving the sample (or tip) up or down in response to any change in the deflection of the cantilever.

Typical modes of operation are contact and dynamic operation. In contact mode the tip and sample remain in close contact, i.e. in the repulsive regime of the interatomic interaction, as scanning proceeds. A common dynamic mode of operation is intermittent contact mode in which an actuator drives the cantilever at its resonant frequency so that the probe tip only contacts the sample surface for a very small fraction of its oscillation period. Another form of dynamic operation is non-contact mode where the cantilever is oscillated above the sample at such a distance that the interatomic interaction force is no longer repulsive.

Recent advances in probe microscopy have led to much faster data collection times. An example of a probe microscope designed for high speed scanning is described in WO 2005/008679. In this document, the probe of the microscope is adapted such that, when subject to an externally applied force, a biasing force urges either or both of the probe tip and a sample towards each other with a magnitude greater than the restoring forces which arising from displacement of the probe tip as it probes the sample. This, in turn, enables the probe to scan a sample surface much more quickly than with a conventional scanning probe microscope.

Recent developments have sought to increase scanning speeds but, with ever increasing scanning speeds, each probe tip needs to be replaced at ever shorter time intervals as a result of wear, contamination or damage etc. Further improvements in microscope efficiency are therefore limited by the time required to replace worn or damaged probes or to swap between different types of probe.

One method of speeding up scanning rates involves the use of arrays of probes to scan over a large sample surface area simultaneously. Examples of the use of probe arrays in this manner can be found in U.S. Pat. No. 6,423,967 and US 2004/0256552. Whilst probe arrays might enable larger surface areas to be scanned simultaneously, the same delays are experienced when the probes need to be replaced.

In U.S. Pat. No. 5,705,814 a scanning probe microscope is described in which probes may be exchanged or replaced by the automation of these procedures. Thus, the probe mount of the microscope incorporates clamping means that is actuated mechanically, electromagnetically or pneumatically for picking up and holding individual cantilever probes. The individual cantilever probes are stored in a holder which takes the place of the sample on the sample stage when a new probe is to be mounted in the microscope and alignment of the probe mount with individual cantilever probes in the holder is automated using signals from the probe detection system.

Also, in US 2004/0256552 a scanning probe microscope is described which includes apparatus for storing a plurality of individual probes in a holder and for automatically transferring the probes individually between the probe holder and the probe mount without requiring displacement of the sample.

Whilst the prior art referred to above offers some improvement in efficiency, through at least partial automation of the procedure for mounting probes in the microscope; the prior art solutions involve additional complexity to the design of the microscope and the probe mount in particular, which is undesirable.

The present invention therefore seeks to provide an improved probe adapted for use in a scanning probe microscope which enables individual replacement probes, being the same as or different to the probe being replaced, to be aligned with the detection system of the microscope extremely rapidly.

The present invention therefore provides a probe assembly for use in a scanning probe microscope, the probe assembly comprising a carrier having a first plurality of at least three probes, each probe having a tip that is located on a plane that is common to the plurality of probe tips and that is moveable from this plane characterised in that the probes are substantially identical and that the assembly also includes addressing means adapted to select one of the plurality of probes for relative movement with respect to a majority of the remainder of the probes.

Preferably, the probe assembly also includes a second plurality of at least three substantially identical probes. In addition, the addressing means can be arranged to select one probe from the first plurality and/or one probe from second plurality. The probes of the second plurality may be a different type of probe to those of the first plurality.

Ideally, the addressing means comprises respective electrical connections to each probe. In one embodiment, the respective electrical connections can include means for applying an electrical potential between the probe and a remote electrode. In another embodiment, each probe includes a resilient supporting beam and the addressing means further includes piezo-electric material connected to the respective electrical connection for bending the supporting beam. In further embodiment, each probe includes a resilient supporting beam and the addressing means comprises at least one additional layer of material applied to the supporting beam, the additional layer being formed from a material that is different from that of the supporting beam, thereby forming a multilayered structure comprising of at least two layers with differing thermal expansion. Preferably the multilayered material is heated by means of a respective resistive heater or a remote light source.

The probe assembly can further comprise a unitary substrate on which said probes are provided, the unitary substrate being mounted on the carrier.

Alternatively, each of said probes can have a respective substrate by which the probe is mounted on the carrier.

Preferably, the plurality of at least three probes are probes of a type selected from the following group of probe types: contact mode probe; dynamic mode probe; nanolithography probe; probe adapted for the measurement of capacitance; probe responsive to local magnetic and/or electric fields; probe adapted for optical near-field microscopy; standard aspect ratio probe; high aspect ratio probe; probes having different tip radii.

In addition, it is desirable for at least one of the probes to have a tip with a radius of curvature of 100 nm or less. Preferably, at least one of the probes has a spring constant of less than 2 Nm$^{-1}$. The probes can be arranged substantially parallel with one another.

In one embodiment, the carrier has internal edges defining at least one slot extending through the carrier and wherein probes are mounted along one or more of the internal edges. Preferably, at least one first probe and at least one second probe are provided on respective opposing internal edges of the probe support. Furthermore, said at least one first probe and at least one second probe can overlap each other such that their tips are arranged in a line.

Preferably the carrier further comprises means for attachment of the carrier to mount on a microscope. The means for attachment may comprise means for storing information for each probe. In addition, the means for attachment may also include a multiplexer for selecting a probe.

In one embodiment, the probe tips are substantially evenly spread within the common plane. Alternatively, at least two probes may be differently spaced within the common plane, in comparison with the remainder of the probes.

In another embodiment a probe is provided on a first probe support and a second probe is provided on a second probe support and the spacing between the tips of the first and second probes is fixed. Alternatively, the probes may have a spacing that is adjustable within the common plane.

In a further embodiment, a first bank of probes is provided on a first probe support and a second bank of probes is provided on a second probe support and the spacing between the tips of the first and second banks is adjustable. Preferably, at least one of the first and second probe supports includes an adjustable spacer for altering the relative position of the two probe supports. At least one first bank and at least one second bank may be provided on respective opposing edges of respective first and second probe supports. In this case, the first and second banks may overlap each other such that the probe tips are arranged in a line. Preferably, each bank is located on a plane which is common to the other banks, and each probe tip in said bank is located a plane in common with the other probe tips in said bank, each bank having respective addressing means. In a preferred embodiment the addressing means is adapted to select at least one bank for relative movement with respect to a majority of the remainder of the probes not in the selected bank, and further adapted to select one of the probes from the selected bank for relative movement with respect to the majority of the remainder of the probes in the bank, the selected probe being the probe in the selected bank that is moved furthest from said majority of the remainder of the probes not in the selected bank.

Preferably, the common plane is substantially parallel to the sample stage.

The present invention further provides a scanning probe microscopy apparatus comprising a sample stage; a mount; a detection system and a probe assembly as described herein attached to the mount. The microscope may also include means for aligning the selected probe with the detection system. This enables automated replacement of a probe with another in the assembly, which is advantageous in further improving total data collection times in cases for which the probe needs to be replaced.

In another aspect, the present invention provides a method of studying a sample surface using a scanning probe microscope having a sample plate and a detection system, the method comprising the steps of: mounting a sample on the sample plate of the scanning probe microscope; mounting a probe assembly, as described herein, in the scanning probe microscope; addressing one or more probes to cause the probe tips of the addressed probes to move out of the common plane relative to the remainder of the probes and thereby selecting one or more probes for scanning the sample surface; positioning the selected probes over the sample surface; aligning the detection system of the scanning probe microscope with the one or more selected probes; generating relative movement between the one or more selected probes and the sample surface; and monitoring the response of the one or more probes to its interaction with the sample using the detection system. This process may be repeated with an alternative selection of probe(s) and the process of alignment with the detection system may be carried out automatically.

Figure 1:
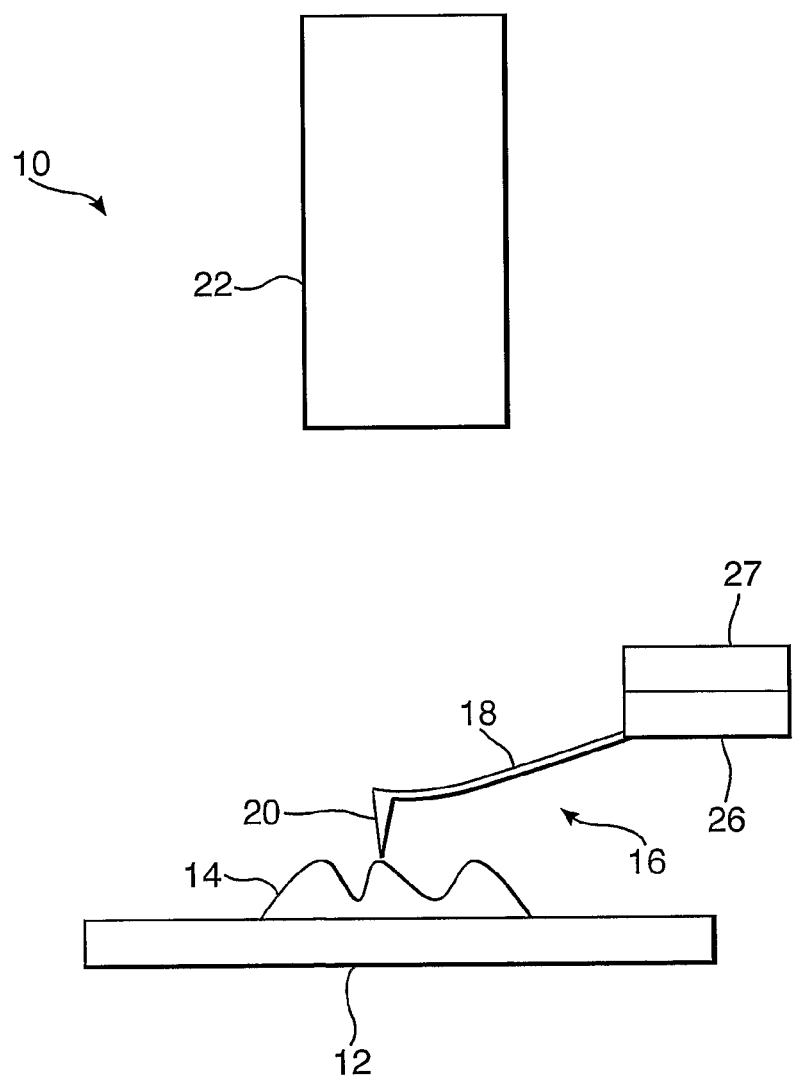
FIG. 1 shows, schematically, a conventional atomic force microscope of the type suitable for use with the improved probe of the present invention.

An atomic force microscope (AFM), indicated generally by 10, is illustrated in FIG. 1 as an example of the type of AFM that could employ the improved probe of the present invention. However, it is to be understood that the present invention is not limited to this particular design of AFM. Instead, the present invention is suitable for use generally with scanning probe microscopes, although specific applications may be envisaged. As an example, it is suitable for use with AFMs adapted to scan the surface of a semiconductor wafer in order to aid the location and identification of defects (i.e. wafer review tools).

The AFM apparatus generally comprises a sample stage in the form of a plate 12 adapted to receive a sample 14; a probe 16 (which is described in greater detail below) having a cantilever 18 and a nanometric probe tip 20; and a detection system 22 for monitoring the deflection of the cantilever 18 relative to its mount. The point of the nanometric tip 20 has a radius of curvature of 100 nm or less and different sizes and shapes of tip may be employed for different types of scanning or image collection. During a scan, an interaction force is developed between the probe tip 20 and the sample surface and the relative deflection or height of the cantilever 18 is indicative of both the sample topography and the strength of the interaction force.

The probe 16 is mounted on position control apparatus 26, for example a piezoelectric transducer, and a coarse driving means 27. The position control apparatus 26 is used to drive the probe 16 in three dimensions: x, y and z directions. As is conventional in the field, the z axis of a Cartesian coordinate system will be taken to be that perpendicular to a plane occupied by the sample 14. That is, the interaction force is dependent both on the xy position of the probe 16 over the sample 14 (the pixel it is imaging), and also on its height above it.

In use, the coarse driving means 27 is used to position the probe relative to the sample 14 and the detection system 22 is aligned with the back of the probe 16 so that the deflection of the probe can be monitored. Fine height and initial start position adjustments are then made whilst the detection system 22 measures the deflection of the probe 16 as a result of the probe—sample interaction force. Once the desired level of interaction force, and hence deflection of the probe cantilever is established, the probe 16 is scanned over the surface of the sample 14 using the position control apparatus 26 whilst the height, deflection or deflection correction of the probe is monitored and/or recorded by the detection system 22.

Figure 2:
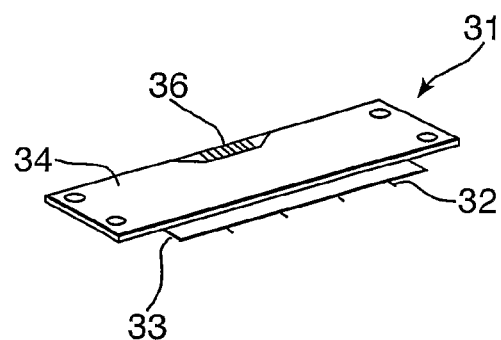
FIG. 2 illustrates a first embodiment of a probe assembly for use in scanning probe microscopy in accordance with the present invention.
Figure 3:
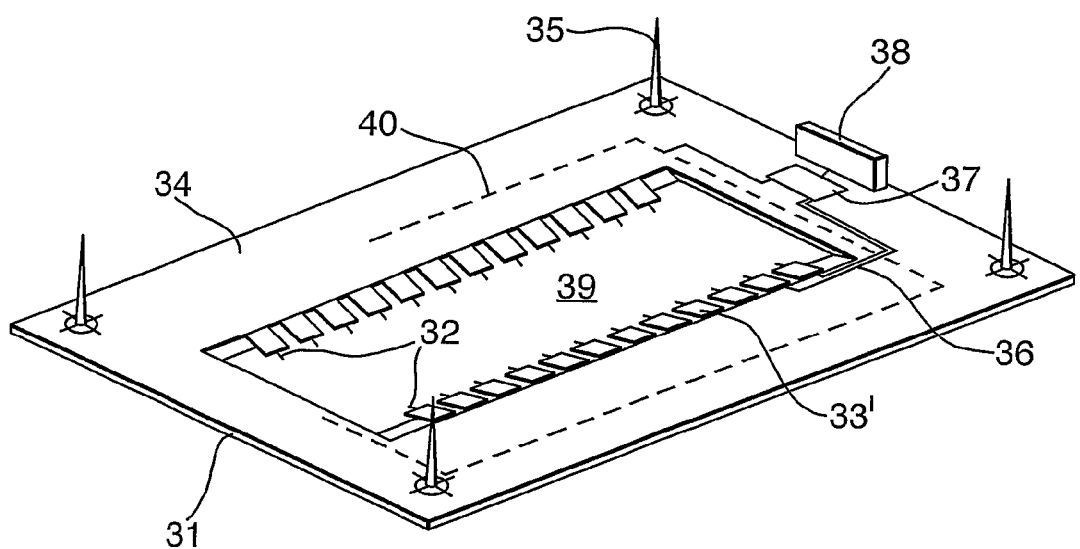
FIG. 3 illustrates an alternative embodiment of a probe assembly for use in scanning probe microscopy in accordance with the present invention.

In FIG. 1, for ease of reference, a single probe 16 is illustrated. In FIGS. 2, 3 and 5 a probe assembly 31, 60, in accordance with the present invention, is illustrated. The probe assembly 31, which is referred to herein as a probe biscuit, has a plurality of individual probes 32 mounted on a unitary substrate 33 (FIG. 2). As the individual probes 32 are mounted on a unitary substrate 33, the spatial positions of each of the probes relative to one another can be very accurately controlled during fabrication. The substrate 33 is, in turn, mounted on a carrier 34, which is common to all of the probes.

The carrier 34 includes means for securing the carrier 34 to the probe mount (not shown) of the microscopy apparatus, for example mounting pins 35 or other conventional means.

The carrier 34 further includes addressing means 36, in this embodiment in the form of electrical connections, which provide an individual connection for each probe 32 to an external power supply (not shown). In the case of FIG. 2, each of the power connections 36 may be individually connected to the external power supply. However, as shown in FIG. 3, for larger numbers of probes, the individual power connections 36 may, optionally, communicate with a multiplexer 37 which is adapted to selectively connect individual power connections 36 to the external power supply 38. Whilst each probe 32 is provided with a respective electrical connection 36, the tip 20 of the probe is isolated from the connection 36 to ensure that the tip-sample interaction is not affected.

In the alternative embodiment of FIG. 3, the individual probes 32 are each provided on a respective substrate 33', with each substrate then being mounted on the common carrier 34. Whilst the probes are mounted along an external edge of the carrier 34 in FIG. 2, it may be seen in the case of FIG. 3 that the carrier 34 may include one or more slots 39 (only one slot is illustrated in FIG. 3), with the probes 32 being mounted along the internal edges of the slots. This is particularly useful where larger numbers of probes are involved. Ideally, the probes 32 are arranged in pre-determined spatial positions relative to the carrier 34 and to each other. The slots may, of course, be of any shape and are required only to provide internal edges to which the individual probes are mounted.

With the arrangement of probes 32 on the probe biscuit 31 illustrated in FIG. 3, each opposing pair of probes, i.e. probes on opposite edges of the slot 39, are at supplementary angles, i.e. the sum of their angles with respect to the sample plate is 180°. This has the effect of the probes on opposing edges of the slot 39 reflecting incident light from the detection system in different directions. Hence, with the probe biscuit 31 of FIG. 3 the detection system preferably includes collection means for collecting reflected light from probes on both sides of the slot 39. For example, the collection system may be repositionable or may include additional optical elements specific to the collection of light reflected from probes on one side of the slot. Alternatively, the scanning microscopy apparatus may be adapted to comprise two detection systems, one for each side of the slot.

Although the probe biscuits of FIGS. 2 and 3 are generally rectangular it should be understood that the carrier 34 may be of any shape suitable for mounting in the microscopy apparatus. Moreover, in the FIG. 3 embodiment it is not necessary to mount the opposing pair of probes at supplementary angles, this is merely a convenient arrangement. Similarly the configuration of the electrical connections 36 are not intended to be limited to the configurations illustrated herein.

Although the means for attaching the probe biscuit to the microscopy apparatus may be any conventional means, a preferred embodiment (not shown) has the carrier 34 fixed within a housing unit, such as a cartridge or cassette, to protect the probes. The housing itself is then adapted to be mounted on the microscopy apparatus with the probe biscuit positioned for use. The housing includes a cover and/or base that can be moved or removed to expose the probes to both the sample and the detection system, in preparation for use. For the case in which the housing includes a cover and a base, these can be moved or removed separately or together. The cover and/or base can be moved or removed prior to mounting or as part of the mounting process. However, it is preferable that the cover and/or base are moved or removed after the housing has been mounted, so that the housing remains closed to protect the probes during the mounting process.

In addition to protection, the housing can also assist in alignment of the probe with the microscope system. The probe biscuit may be accurately positioned within the housing such that manual location of the housing in a set position (which may be indicated by slots, grooves or the like) on the microscope system positions the biscuit, at least approximately, ready for use.

Moreover, the housing may also be used to store a chip containing calibration or other information about individual probes or about the assembly itself. As described in more detail below, such information can be used for automated realignment of the biscuit to select a replacement probe. The chip may also be used to monitor usage of each probe and updated as an individual probe is used. Such information may be exploited to limit probe usage, for example to a number of scans for which the probe is expected to function to a required specification.

The probe biscuit 31 functions as a repository of individual probes 32 for use in scanning probe microscopy: It is not intended that all of the probes on the probe biscuit 31 are used simultaneously. Instead, the probes 32 on a probe biscuit are selected, by means of the addressing means 36, for use individually or in groups. Selection is performed by lowering the chosen probe or probes so as to bring the probe or probes into contact with or close to the surface of the sample; or by raising all unselected probes. Hence, when no probes are selected the probe tip of each of the probes is located in a common plane. When one or more of the probes is selected, the probe tips of either the selected probes or all unselected probes are caused to move out of the common plane relative to the remainder of the probes.

To enable probe selection, a lower electrode (not shown) may be arranged beneath the sample 14 with the probes 32 on the probe biscuit 31 all being adapted to be selected to function as second electrodes. For example, an individual one of the probes 32 is selected by applying a potential difference between the lower electrode, beneath the sample 14, and the selected probe 32. This generates an attractive force which urges the selected probe 32 to bend towards the lower electrode and thus towards the sample 14. For the case in which the scanning probe microscope is being used for wafer inspection, the wafer itself may be employed as the lower electrode.

As illustrated in FIG. 3, an upper electrode 40 (indicated in dotted lines) may be provided over the probe biscuit 31, on the opposite side of the biscuit to the sample 14. Where a vertical detection system is being used in the microscopy apparatus, the upper electrode may be in the form of a glass layer which is coated with an electrically conductive material, for example $TiO_2$, so as to ensure transmission of light to and from the probes 32, across the glass layer and its coating. Of course, if a non-vertical optical detection system or a non-optical detection system is employed in the microscopy apparatus then the need for the upper electrode to be light transmissive is removed. In this case by applying a electrical potential between the probes and the coating of the upper electrode 40, the probes will be attracted towards the upper electrode 40 and so away from the sample 14. Therefore, in this embodiment the electrical potential is applied to all of the probes except the selected probe or probes.

In a third embodiment, both the lower electrode beneath the sample 14 and the upper electrode above the probe biscuit 31 are provided. With this embodiment the lower electrode is electrically connected, across a power supply, to the upper electrode 40 and enables an electromagnetic field to be established across the sample 14 and the carrier 31. By applying an electrical potential to selected probes 32, by means of the individual electrical connections 36, one or more probes can be caused to move towards or away from the lower electrode and thus towards or away from the sample 14, in dependence upon the electrical potential applied thereto.

A further alternative involves the use of remote addressing means for generating a pressure gradient with respect to selected probes, e.g. by blowing an inert gas or air on the selected probes, to cause the selected probes to deflect towards the specimen.

Figure 4:
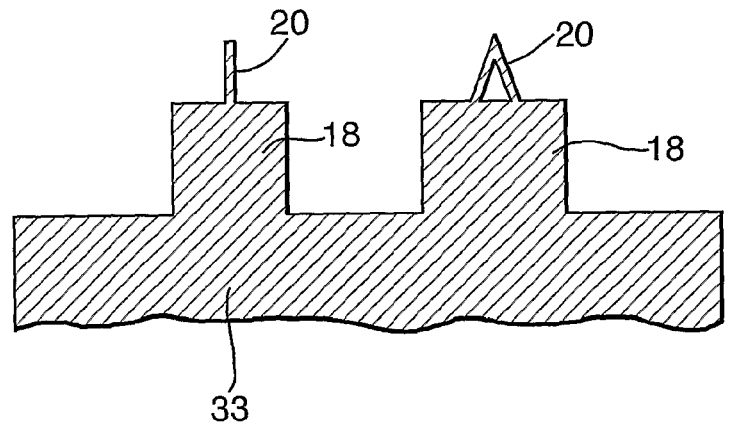
FIG. 4 illustrates the structure of the cantilevers of two probes on a probe assembly in accordance with the present invention.

To minimise the field strength necessary to urge the addressed probes out of the common plane of the probe tips, the supporting beam of each probe may be adapted to increase its surface area, for example by widening at least the base of the supporting beam (see FIG. 4), and thereby increase the force the supporting beam experiences in the electric field arising from the applied electrical potential. This is particularly desirable in the case of probes having high spring constant cantilevers as typically used in dynamic mode operation.

With the probe assembly described herein, one or more of the cantilevers of the probes may be designed to be mechanically damped and/or include a means for the application of an external force, which is advantageous in certain imaging techniques.

The upper and lower electrodes may be replaced by electrically actuated material, such as piezo-electric material, which is provided, individually, on each probe to enable the probes to be bent towards or away from the sample 14. In a further alternative, the selection and hence movement of the individual probes towards or away from the sample may be achieved by providing a bi- (or more) layered strip on each probe. Each layer is made of a material with different coefficients of expansion. In this way, as the strip is heated, it will bend, which in turn will move the probe. The layers may be metal, silicon or silicon nitride, or other materials that display the property of differing expansivities. The advantage of silicon or silicon nitride is that these are common materials for probe fabrication and hence the probe itself may form one layer of the strip. Each bilayered strip may be heated individually by means of a resistive heater connected to the local electrical connections 36 or may be heated remotely, for example by means of light from a laser in which case the electrical connections 36 may be omitted.

For the sake of clarity, only a small number of probes 32 are illustrated in FIGS. 2, 3 and 5. In practice, it is envisaged that each multi-probe biscuit 31 may have many more probes. For example, the individual probes may be separated from each other from as little as a few microns up to tens of microns, or more. This would enable hundreds of probes to be provided on a single edge of a 5 cm probe biscuit. As illustrated in FIG. 3, each probe biscuit may include a plurality of edges further multiplying the total number of probes provided on each probe biscuit.

With each probe biscuit 31, once one probe has been worn out or damaged, the microscopy apparatus need only be realigned to a second probe on the same probe biscuit for scanning to be continued. Furthermore, time spent in realignment of the microscopy apparatus can be kept to a minimum as each probe on the probe biscuit has a known spatial relationship to every other probe. This additionally means that realignment of the microscopy apparatus may be automated. For example, the detection system of the microscopy apparatus may be used in aligning replacement probes on the same probe biscuit. Alternatively, optical imaging of the probe may be used in combination with pattern recognition programming, to align the detection system automatically with a new selected probe. In a further alternative, each probe of the probe biscuit may be assigned a unique identification code and its spatial position relative to the other probes on the same probe biscuit stored. This would enable computerised control of the realignment of the detection system of the microscopy apparatus to a new probe on the same biscuit as well as selection of the new probe by connecting the selected probe to the power source. Moreover, where the order in which the probes replace one another is predetermined, automated realignment is possible without the need for individual probe identification codes.

It should be further noted that the probe biscuit 31 may comprise a plurality of different types of probe which are individually selectable and enable different types of sample analysis without the need to remove and replace the probe mounting between scans. For example, different types of probe that may be provided on a single probe biscuit are: contact mode probes typically having a low spring constant e.g. <2 N/m; dynamic mode probes typically having a higher spring constant e.g. >10 N/m, typically 40 N/m and sometimes higher; nanolithography probes having a hardened coating such as diamond; and probes with re-entrant shaped tips specifically for use in 3D imaging In certain cases, fabrication of the different types of probes on a single substrate 33 would be difficult. In these circumstances, the probes may be provided on individual substrates which are then mounted on a common carrier, as illustrated in FIG. 3.

Specifically, probe biscuit 31 may comprise a plurality of probes having different aspect ratios and/or probes of differing sharpness which are individually selectable. Aspect ratio and sharpness are different characteristics of a probe that are commonly confused, and so it is worth explaining the distinction. The sharpness of a probe is defined by the radius of curvature of the point of the probe tip. The smaller the radius of curvature, the sharper the probe tip. The aspect ratio on the other hand is the ratio of the length of the probe tip to the width of its base. That is, it is a measure of the gradient as the probe tapers to the point of its tip. Standard probes typically have tips with aspect ratios of <5:1; high aspect ratio probes typically have tips with aspect ratios of >10:1. High aspect ratio probes are better adapted for imaging inside structure within a sample surface. Sharper tips provide improved resolution.

Thus, with a single probe biscuit having a plurality of different types of probe, it is possible to perform an initial high speed review of a sample area for identification of a location of interest, and then a slower, more delicate, or otherwise complementary scan of the identified location, without changing the probe biscuit. This is particularly beneficial because with conventional scanning microscopy apparatus it can be very difficult to return accurately to a sample location with a different probe, after the initial scan in which the sample location has been identified. Also conventional scanning microscopy methods would be, in comparison with employing the probe biscuit of the present invention, very time consuming.

An application in which using multiple probe configurations to provide scans of different characteristics is of particular benefit is in the semiconductor industry. In the assessment of a semiconductor wafer where, once an area of interest has been located using a standard probe tip, a sharper probe tip may be selected from the same probe biscuit, to perform a slower scan of the location of interest to provide a more detailed image of this selected area. Alternatively the area of interest can be rescanned with a probe tip with high aspect ratio and/or a re-entrant shape. The sharper probe provides a higher resolution measurement of the roughness of the surface and the high aspect ratio probe tip can enter holes and trenches in the surface of the wafer.

Alternatively, with the probe biscuit it is possible to switch between individual probes on the probe biscuit which have been optimised for either a contact mode or a dynamic mode of operation. It is also possible to switch between a probe used for imaging a sample surface and a probe used in nanolithography of that same surface, without replacement of the probe biscuit.

As will be apparent, the probe biscuit described above, with its individually selectable probes, enables the time required to install alternative probes or to replace damaged, contaminated or worn probes to be minimised. Rather than the manual or automated removal and replacement of a probe, with the probe biscuit of the present invention all that is required is the realignment of the detection system to a new probe on the same biscuit. Furthermore, with conventional methods of replacing worn probes, uncertainty in the position of the new probe with respect to the sample surface, relative to the position of the old probe, arises. However, as the relative positions of each of the probes on the probe biscuit is known, this uncertainty in sample location can be avoided.

Figure 5A:
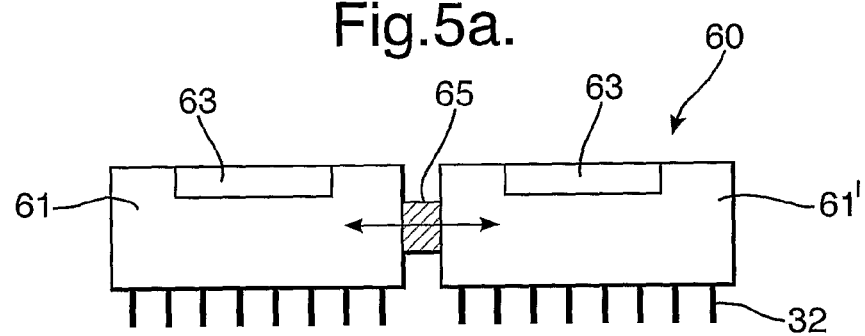
FIGS. 5a, 5b, 5c and 5d illustrate four alternative embodiments of a probe assembly in accordance with the present invention.
Figure 5B:
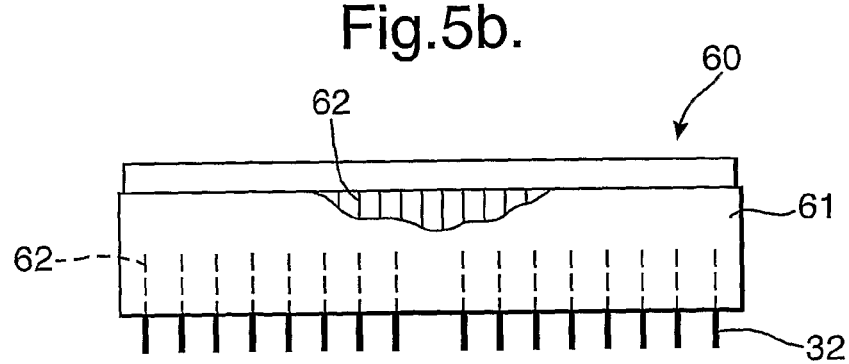
Figure 5C:
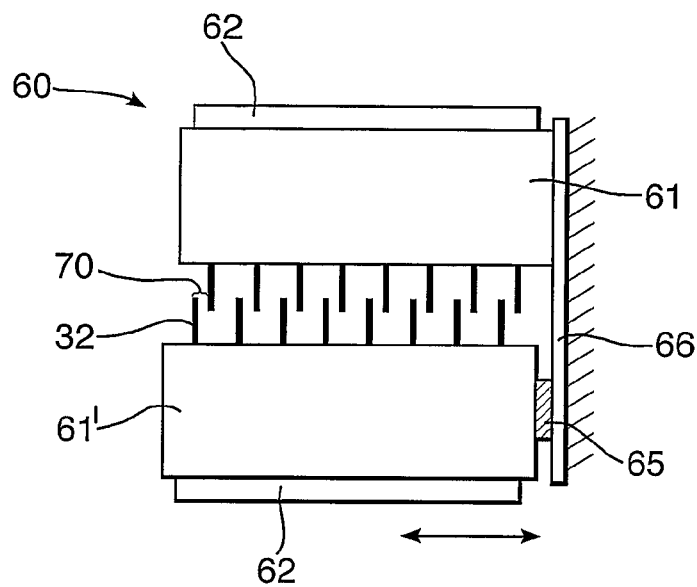
Figure 5D:
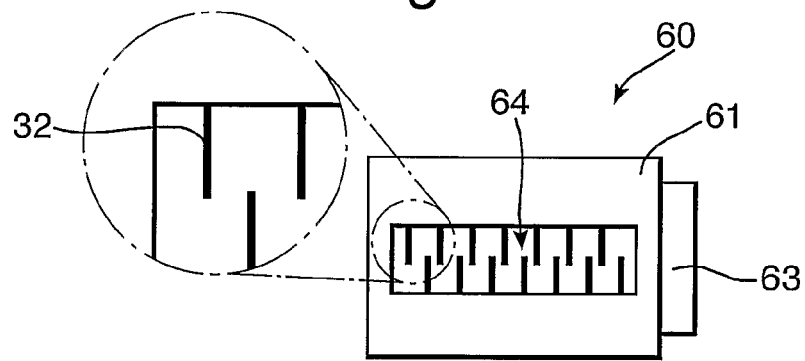

Alternative embodiments 60 of the design of the probe biscuit are shown in FIGS. 5a, 5b, 5c and 5d. The probe biscuit 60 has a plurality of individual probes 32 which may be mounted on a unitary substrate 61 (FIGS. 5b and 5d). The substrate 61 is, in turn, mounted on a carrier (not shown), which is common to all of the probes, and which includes mounting means as previously described. Alternatively, the carrier may be omitted and the unitary substrate may be adapted for attaching to a probe mount. As the individual probes 32 are mounted on a common, unitary substrate 61, the spatial position of each of the probes, relative to one another, is very accurately controlled during fabrication.

The substrate 61 includes addressing means 62, in this embodiment in the form of electrical connections, which provide an individual connection for each probe 32 to an external power supply (not shown). Each of the power connections 62 may be individually connected to the external power supply or for larger numbers of probes, the individual power connections 62 may, optionally, communicate with a multiplexer 63 which is adapted to selectively connect individual power connections 62 to the external power supply. Whilst each probe 32 is provided with a respective electrical connection 62, the tip of the probe is isolated from the connection 62 to ensure that the tip-specimen surface interaction is not affected.

Regardless of the mechanism chosen for selecting one probe in preference to another, the selection process itself may also be varied. For example, a bank of probes may be partly deflected in response to a first selection signal and then a particular probe from this bank deflected further by a second selection signal. Alternatively, a first subset of probes may be selected by partial deflection in response to a first signal and a second subset by partial deflection in response to a second signal. If only one probe is common to both subsets, then this probe will be the only one that is fully deflected, and therefore selected to probe the sample.

Whilst the probes 32 are mounted along an external edge of the substrate 61 in FIG. 5b, it may be seen in the case of FIG. 5d that the substrate 61 may include one or more slots 64 (only one slot is illustrated in FIG. 5d), with the probes 32 being mounted along the internal edges of the slots. This is particularly useful where larger numbers of probes are involved. Ideally, the probes 32 are arranged in pre-determined spatial positions relative to the substrate 61 and to each other. The slots may, of course, be of any shape and are required only to provide internal edges to which the individual probes are mounted.

As for previous embodiments, although the probe biscuits 60 of FIGS. 5a, 5b, 5c and 5d are generally rectangular, it should be understood that the substrate 61 may be of any shape suitable for mounting on the microscope. Similarly, the means for attaching the probe biscuit to the microscope may be any conventional means and the configuration of the electrical connections 62 are not intended to be limited to the configurations illustrated herein.

The probe biscuit 60 functions as a repository of individual probes 32 for use in local probe instruments. It is not intended that all of the probes on the probe biscuit 60 are used simultaneously. Instead, the probes 32 on a probe biscuit are selected, by means of the addressing means 36, for use individually or in groups. As for all embodiments, selection is performed by lowering the chosen probe or probes so as to bring the probe or probes into contact with or close to the surface of the sample; or by raising all unselected probes. Hence, when no probes are selected the probe tip of each of the probes is located in a common plane. When one or more of the probes are selected, the probe tips of either the selected probes or all unselected probes are caused to move out of the common plane relative to the remainder of the probes.

In the semiconductor industry there is a need to inspect semiconductor wafers for defects. In this application, pairs of probes having a known separation can be used to enable a microscope to scan simultaneously two different regions of the same wafer. Therefore, as a single wafer has on it many identical features, the probe pairs can be selected so that they individually image the identical device feature at two separate locations on the same wafer. Any differences, including those in surface height, found between the measurements of the two probes enable efficient defect location and/or classification.

It will, of course, be apparent that where two or more probes are being used the images may be collected sequentially or simultaneously. Where simultaneous image collection is to be performed, respective detection systems may be provided for each probe. Alternatively, a single detection system may be used in which case individual height measurements for one of the probes may be interleaved with measurements recorded by the second probe and the images extracted by a probe controller (not shown) through appropriate synchronisation of the probe scans and image data. The simultaneous collection of two images is particularly advantageous as both probe height measurements are subjected to the same noise and so the noise is cancelled out in any comparative analysis of the true height measurements of the two probes. This is especially relevant where the microscope is being used on a semiconductor wafer production line, due to the high environmental acoustic noise and vibration.

In the case of the probe biscuits shown in FIGS. 5b and 5d, the separation of individual probes 32 is predetermined at fabrication. In the case of the biscuits shown in FIGS. 5a and 5c, though, the separation of the probes is adjustable by means of an adjustable spacer 65. The adjustable spacer 65 preferably comprises piezoelectric material which will expand or contract in dependence on an applied voltage. Thus, in the case of FIG. 5a a second probe biscuit 61' is connected to the first probe biscuit 61 via the variable spacer 65. The separation of the two probe biscuits 61, 61' can therefore be adjusted and thereby the separation between a probe on the first biscuit 61 and a probe on the second biscuit 61' can be similarly adjusted. With the embodiment of the probe assembly in FIG. 5c the individual probes on two separate probe biscuits face towards one another with their tips at least partially overlapping. The first probe biscuit 61 is permanently attached to a carrier bar 66 whereas the second probe biscuit 61' is attached to the same carrier bar 66 by means of an adjustable spacer 65. Here too, the separation 70 of respective probes on each of the two probe biscuits may be altered by adjusting the thickness of the adjustable spacer 65.

With the probe assemblies illustrated in FIGS. 5a and 5c, the separation of the probes may, for example, be adjusted to accommodate different feature repeats on a semiconductor wafer. Also, although not shown, means such as additional spacers may be provided to enable the separation of the probes to be adjusted in either one or two dimensions in a plane substantially parallel to the surface of the wafer or specimen.

With the arrangement of probes 32 on the probe biscuit 60 illustrated in FIG. 5d, each opposing pair of probes, i.e. probes on opposite edges of the slot 64, are at supplementary angles, i.e. the sum of their angles with respect to the specimen stage is 180°. The effect of this has been described earlier in relation to FIG. 3.

Probe selection is enabled as previously described. Mechanisms and methods for selecting a single probe apply equally to selecting a pair of probes for simultaneous scanning.

Instead of a conventional AFM, the probe biscuit may be used with a microscope having a resonant scanner. In this case, the probe biscuit would be mounted on a resonator, such as one prong of a tuning fork.

Alternatively, the probe biscuit 31 may be employed with the probe microscope described in WO 2005/008679, the contents of which is incorporated herein by reference. With this particular high speed probe microscope, the probe 16 is chosen to have a low spring constant, e.g. less than 1 $Nm^{-1}$ and is provided with a polymer coating which is applied to one or both sides of the cantilever 18 of the probe which ensures that the probe 16 has a low Q factor. The preferred coating is a rubber with low cross-link density, the degree of which is just sufficient to maintain the coherence of the coating. Cross-links can either be chemical, as in a conventional rubber, or physical, as in a thermoplastic elastomer. Alternatively, control of the Q factor of the probe could be by other means, for example electronic control, and in the case where the sample and probe are within a sealed viscous environment the polymer coating may be omitted as exposure of the probe to the liquid environment may be sufficient to ensure the desired low Q factor.

It is to be noted that the apparatus described above is merely illustrative of the applicability of the present invention to fast scanning techniques. It will, of course, be appreciated that, as mentioned earlier, the microscopy probe of the present invention is equally applicable to slower scanning methods and to numerous different scanning probe microscopes.

In taking images using this probe microscope, a biasing force which is deflection independent is provided which urges the probe tip and the sample towards each other. The biasing force may arise from an electrostatic potential applied between the sample and the probe and this electrical potential may be the same electrical potential used to select one or more probes of the probe biscuit. Of course the biasing force may be produced by other means e.g. pressure gradient or magnetic, where appropriate.

Probe deflection may be measured by many different means including, but not limited to, the optical lever technique, interferometry and piezoelectrically coated probes as well as detection of thermal variations in the radiant output of a heated probe. Also, although the use of piezoelectric actuators for control of the movement of the probe, or the sample plate, is preferred, other actuators involving for example thermal expansion of a control rod, or a voice coil are envisaged.

The probe biscuit may also be employed in probe microscopy apparatus designed to monitor other interactions between probe and sample. Examples of other interactions may include optical, capacitive, electromagnetic, magnetic, electric, lateral, shear force or thermal interactions.

The invention claimed is:

1. A probe assembly for use in a scanning probe microscope, the probe assembly comprising a carrier having a first plurality of at least three probes, each probe of the first plurality having a tip that is located on a common plane that is common to the plurality of probe tips and that is moveable from the common plane, wherein the probes of the first plurality are substantially identical and the assembly also includes addressing means adapted to select one of the plurality of probes for relative movement with respect to a majority of the remainder of the probes;

the carrier having internal edges defining at least one slot extending through the carrier and the first plurality is mounted along one or more of the internal edges;

at least one first probe and at least one second probe of the first plurality is provided on respective opposing internal edges of the probe support; and the at least one first probe and the at least one second probe overlap each other such that their tips are arranged in a line.

2. A probe assembly according to claim 1, wherein the carrier includes a means for attachment to a mount on a microscope.

3. A probe assembly according to claim 1, wherein the at least three probes are probes of a type selected from the following group of probe types: contact mode probe; dynamic mode probe; nanolithography probe; probe adapted for the measurement of capacitance; probe responsive to local magnetic fields; probe responsive to electric fields; probe responsive to magnetic and electric fields; probe adapted for optical near-field microscopy; standard aspect ratio probe; high aspect ratio probe; and probes having different tip radii.

4. A probe assembly according to claim 1, wherein at least one of the at least three probes has a tip radius of curvature of 100 nm or less.

5. A probe assembly according to claim 1, wherein at least one of the at least three probes has a spring constant of less than 2 $Nm^{-1}$.

6. A probe assembly for use in a scanning probe microscope, the probe assembly comprising a carrier having a first plurality of at least three probes, each probe of the first plurality having a tip that is located on a common plane that is common to the plurality of probe tips and that is moveable from the common plane, wherein the probes of the first plurality are substantially identical and the assembly also includes addressing means adapted to select one probe of the first plurality for relative movement with respect to a majority of the remainder of the probes of the first plurality:
   wherein a first bank of probes from the at least three probes is provided on a first probe support and a second bank of probes from the at least three probes is provided on a second probe support and wherein the spacing between the tips of the first and second banks is adjustable within the common plane: and wherein the addressing means is adapted to perform selection by moving the one probe of the first plurality so that its tip moves out of the common plane into contact with or close to the surface of a sample whilst the tips of the majority of a remainder of the probes of the first plurality remain located on the common plane,
   wherein at least one first bank and at least one second bank are provided on respective opposing edges of respective first and second probe supports, and
   wherein said first and second banks overlap each other such that the probe tips are arranged in a line.

7. A probe assembly as claimed in claim 6, wherein each bank is located on a plane which is common to the other banks, and each probe tip in said bank is located on a plane in common with the other probe tips in said bank, each bank having respective addressing means.

8. A probe assembly as claimed in claim 7, wherein the addressing means is adapted to select at least one bank for relative movement with respect to a majority of the remainder of the probes not in the selected bank, and further adapted to select one of the probes from the selected bank for relative movement with respect to the majority of the remainder of the probes in the bank, the selected probe being the probe in the selected bank that is moved furthest from said majority of the remainder of the probes not in the selected bank.

9. A probe assembly according to claim 1, wherein the common plane is substantially parallel to the sample stage.

10. A method of studying a sample surface using a scanning probe microscope a sample plate and a detection system, the method comprising the steps of:
   mounting a sample on the sample plate of the scanning probe microscope;
   mounting a probe assembly and remote light source in the scanning probe microscope, the probe assembly comprising a carrier having a first plurality of at least three probes, each probe of the first plurality having a tip that is located on a common plane that is common to the tips of the first plurality and that is moveable from the common plane, wherein each probe of the first plurality includes a resilient supporting beam and at least one additional layer applied to the supporting beam, the additional layer being formed from a material that is different from that of the supporting beam, thereby forming a multilayered structure comprising at least two layers with differing thermal expansion, and the remote light source is adapted to select one of the plurality of probes for relative movement with respect to a majority of a remainder of the probes by heating the multilayered structure;
   directing light from the remote light source on to one or more of the at least three probes to cause the probe tips of the one or more of the at least three probes to move out of the common plane relative to the remainder of the probes and into contact with or close to the sample surface whilst the tips of the majority of a remainder of the probes remain located on the common plane thereby selecting the one or more of the at least three probes for scanning the sample surface;
   positioning the selected probes over the sample surface;
   aligning the detection system of the scanning probe microscope with the one or more selected probes;
   generating relative movement between the one or more selected probes and the sample surface;
   monitoring the response of the one or more selected probes to its interaction with the sample using the detection system;
   directing light from the remote light source on to a second set of one or more probes to cause the probe tips of the one or more probes to move out of the common plane relative to the remainder of the probes and thereby selecting the one or more probes for scanning the sample surface;
   positioning the second set of selected probes over the sample surface;
   realigning the detection system of the scanning probe microscope with the second set of selected probes;
   generating relative movement between the second set of selected probes and the sample surface; and
   monitoring the response of the one or more probes to its interaction with the sample using the detection system.

11. A method according to claim 10, wherein the step of realigning the detection system is carried out automatically.

* * * * *